(12) United States Patent
Wen

(10) Patent No.: US 8,910,757 B2
(45) Date of Patent: Dec. 16, 2014

(54) HEAT-DISSIPATING DEVICE FOR HYDRAULIC BRAKE SYSTEM

(76) Inventor: Yuan-Hung Wen, Chang Hua County (TW)

(*) Notice: Subject to any disclaimer, the term of this patent is extended or adjusted under 35 U.S.C. 154(b) by 168 days.

(21) Appl. No.: 13/558,297

(22) Filed: Jul. 25, 2012

(65) Prior Publication Data

US 2014/0027215 A1 Jan. 30, 2014

(51) Int. Cl.
*F16D 65/78* (2006.01)

(52) U.S. Cl.
USPC ................................. 188/264 R; 188/264 F

(58) Field of Classification Search
USPC ............................ 188/264 A, 264 F; 137/338
See application file for complete search history.

(56) References Cited

U.S. PATENT DOCUMENTS

| | | | | |
|---|---|---|---|---|
| 2,063,742 A * | 12/1936 | Holmes | ................... | 210/186 |
| 2,486,124 A * | 10/1949 | Crockett | .................. | 137/338 |
| 3,294,148 A * | 12/1966 | Alvarado | .................. | 137/338 |
| 3,411,746 A * | 11/1968 | Scaramucci | ............ | 251/315.08 |
| 3,699,847 A * | 10/1972 | Little | .................. | 91/508 |
| 3,720,227 A * | 3/1973 | Curran | .................. | 137/339 |
| 3,776,333 A * | 12/1973 | Mathauser | .................. | 188/344 |
| 3,924,619 A * | 12/1975 | Banjavich et al. | ....... | 128/204.17 |
| 3,993,174 A * | 11/1976 | Williams et al. | .............. | 188/344 |
| 4,036,333 A * | 7/1977 | Mathauser | ................ | 188/264 A |
| 4,142,577 A * | 3/1979 | Klein | .................. | 165/80.4 |
| 4,175,648 A * | 11/1979 | Sule | .................. | 188/344 |
| 4,405,160 A * | 9/1983 | Tyuuman | .................. | 285/39 |
| 4,441,592 A * | 4/1984 | Everett | .................. | 188/264 A |
| 4,491,095 A * | 1/1985 | Coad | .................. | 123/46 R |
| 4,589,380 A * | 5/1986 | Coad | .................. | 123/46 R |
| 4,840,348 A * | 6/1989 | Takigawa et al. | .......... | 251/63.6 |
| 4,874,193 A * | 10/1989 | Martin | .................. | 285/369 |
| 4,887,487 A * | 12/1989 | Mayfield | .................. | 475/74 |
| 4,921,081 A * | 5/1990 | Chilcote | .................. | 188/344 |
| 4,967,780 A * | 11/1990 | Minami | .................. | 137/60 |
| 4,979,366 A * | 12/1990 | Compton et al. | .............. | 60/533 |
| 4,991,627 A * | 2/1991 | Nix | .................. | 137/614.03 |
| 5,180,353 A * | 1/1993 | Snyderman | ................. | 482/111 |
| 5,363,739 A * | 11/1994 | Sydow | .................. | 91/346 |
| 5,701,853 A * | 12/1997 | Takahashi | ................. | 123/41.33 |
| 5,813,501 A * | 9/1998 | Terry, Sr. | ..................... | 188/344 |
| 5,975,118 A * | 11/1999 | Ulicny et al. | ................ | 137/338 |
| 6,041,898 A * | 3/2000 | Maeda | .................. | 188/264 P |
| 6,170,617 B1 * | 1/2001 | Nakamura | .................. | 188/71.6 |
| 6,186,559 B1 * | 2/2001 | Fisher et al. | .................. | 285/256 |
| 6,196,358 B1 * | 3/2001 | Nakamura | .................. | 188/71.6 |
| 6,202,802 B1 * | 3/2001 | Nakamura | .................. | 188/71.6 |
| 6,311,710 B1 * | 11/2001 | Facas et al. | .................. | 137/1 |
| 6,321,879 B2 * | 11/2001 | Nakamura | .................. | 188/71.6 |
| 6,321,880 B2 * | 11/2001 | Nakamura | .................. | 188/71.6 |
| 6,427,970 B1 * | 8/2002 | Silva | .................. | 251/129.01 |
| 6,591,896 B1 * | 7/2003 | Hansen | .................. | 165/51 |
| 6,761,574 B1 * | 7/2004 | Song et al. | .................. | 439/320 |
| 6,997,284 B1 * | 2/2006 | Nahrwold | .................. | 184/6.12 |
| 7,614,485 B2 * | 11/2009 | Pabst | .................. | 188/264 CC |

(Continued)

*Primary Examiner* — Robert A Siconolfi
*Assistant Examiner* — James Hsiao

(57) ABSTRACT

A heat-dissipating device for hydraulic brake system is provided. The device includes a heat-dissipating element and a plurality of heat-dissipating tube units. The heat-dissipating element has a heat-dissipating portion which has large surface area, and is located between a brake mechanism and an oil tube. The heat-dissipating tube units are sleeved around the oil tube in order. Thereby, the heat generated by the brake mechanism can be dissipated rapidly by the heat-dissipating element and the heat-dissipating tube units, so as to promote performance of the brake mechanism.

13 Claims, 7 Drawing Sheets

(56) References Cited

U.S. PATENT DOCUMENTS

| | | | |
|---|---|---|---|
| 8,261,537 B2 * | 9/2012 | Osbat et al. | 60/286 |
| 8,365,878 B2 * | 2/2013 | Takizawa et al. | 188/72.5 |
| 8,394,241 B2 * | 3/2013 | Wang | 202/160 |
| 8,464,848 B2 * | 6/2013 | Wen | 188/71.6 |
| 8,500,150 B2 * | 8/2013 | Cho | 280/212 |
| 2001/0009213 A1 * | 7/2001 | Nakamura | 188/26 |
| 2003/0010585 A1 * | 1/2003 | Okada et al. | 188/251 A |
| 2003/0221726 A1 * | 12/2003 | Semeia | 137/338 |
| 2004/0118831 A1 * | 6/2004 | Martin | 219/494 |
| 2008/0289326 A1 * | 11/2008 | Ohashi et al. | 60/464 |
| 2010/0276008 A1 * | 11/2010 | Abrams | 137/68.14 |
| 2010/0288481 A1 * | 11/2010 | Zobel et al. | 165/182 |
| 2012/0222927 A1 * | 9/2012 | Marking | 188/274 |

\* cited by examiner

US 8,910,757 B2

HEAT-DISSIPATING DEVICE FOR HYDRAULIC BRAKE SYSTEM

BACKGROUND OF THE INVENTION

1. Field of the Invention

The present invention relates to a heat-dissipating device, more particularly, to a heat-dissipating device for hydraulic brake system.

2. Description of the Prior Art

Generally speaking, a hydraulic brake system of a bicycle includes a brake mechanism, an oil hydraulic cylinder and an oil tube which is connected to a brake handlebar. When the brake handlebar is pressed, the liquid in the oil tube is forced to flow to the oil hydraulic cylinder and the brake mechanism, and the brake mechanism is pressed by the hydraulic force to contact the wheel so as to make a brake.

However, the friction resulted from the contact of the brake mechanism and the wheel can generate lot of heat to lead to a high temperature of the brake mechanism. If the temperature of the brake mechanism is unexpectedly high, the brake effect of the brake mechanism is poor, and the brake mechanism is worse in structural strength and mechanical properties, thus resulting in risks of riding.

Therefore, to improve brake performance and riding safety, it is very important to rapidly dissipate the heat from the brake mechanism so as to lower the temperature of the brake mechanism. In a conventional heat-dissipating mechanism as disclosed in TW TWM284806, a heat-dissipating element is disposed between an oil tube and an oil hydraulic cylinder, the heat-dissipating element is formed with plural fins to increase heat-dissipating surface area, so as to help brake mechanism to rapidly dissipate the heat. In the above conventional heat-dissipating mechanism, the oil tube and a heat-dissipating element are screwed together via a tube fixedly disposed at the distal end of the oil tube. Hence, the liquid can possible leak from the joint portion of the oil tube and the heat-dissipating element. Additionally, the assembly of the tube and the oil tube not only is inconvenient in production but also can cause a limitation to the length of the oil tube. As such, since the assembly of the tube and the oil tube is completed, it is hard to be changed. More importantly, the heat-dissipating element cannot sufficiently dissipate the heat. The liquid from the brake mechanism flows back into the oil tube, and since the oil tube is usually of non-metal material so that its heat-dissipating efficiency is poor, the heat of the liquid in the oil tube is hard to be dissipated outside. Therefore, the high-temperature liquid flows into the brake mechanism in a next brake, thus degrading the brake performance of the brake mechanism.

The present invention is, therefore, arisen to obviate or at least mitigate the above mentioned disadvantages.

SUMMARY OF THE INVENTION

The main object of the present invention is to provide a heat-dissipating device for hydraulic brake system which has larger heat-dissipating surface area so as to promote the performance of heat-dissipation and is flexibly adjustable.

To achieve the above and other objects, a heat-dissipating device for hydraulic brake system of the present invention includes a heat-dissipating element, a sleeve element and a plurality of heat-dissipating tube units.

The heat-dissipating element is hollow and has a fixation end and a connecting end corresponding to each other, wherein the fixation end is connected to and communicated with a hydraulic cylinder or a brake mechanism, the connecting end is received in an oil tube so that the heat-dissipating element and the oil tube are tightly connected and communicated with each other. The heat-dissipating element has a heat-dissipating portion disposed between the fixation end and the connecting end.

The sleeve element is sleeved around the joint portion of the heat-dissipating element and the oil tube and disposed at the connecting end of the heat-dissipating element. The sleeve element can strengthen the combination of the heat-dissipating element and the oil tube and improve leakage-proof effect.

The heat-dissipating tube units are sleeved around the oil tube and sequentially connected, and one of the heat-dissipating tube units abuts against the sleeve element.

The heat-dissipating device for hydraulic brake system may further includes a adjusting element, wherein the adjusting element is disposed at one end of the oil tube away from the heat-dissipating element, the heat-dissipating tube units which are sequentially connected abut against and between the sleeve element and the adjusting element and are thereby positioned, and the adjusting element is adjustable in length so as to abut against the heat-dissipating tube units and be thereby positioned.

Whereby, the heat-dissipating device for hydraulic brake system of the present invention can significantly improve the heat-dissipating efficiencies of the hydraulic cylinder and the oil tube, is easy to adjust and mount, and is suitable for various types of bicycles.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 8C is a partial perspective view according to a seventh embodiment of the present invention.

DETAILED DESCRIPTION OF THE PREFERRED EMBODIMENTS

Figure 1:
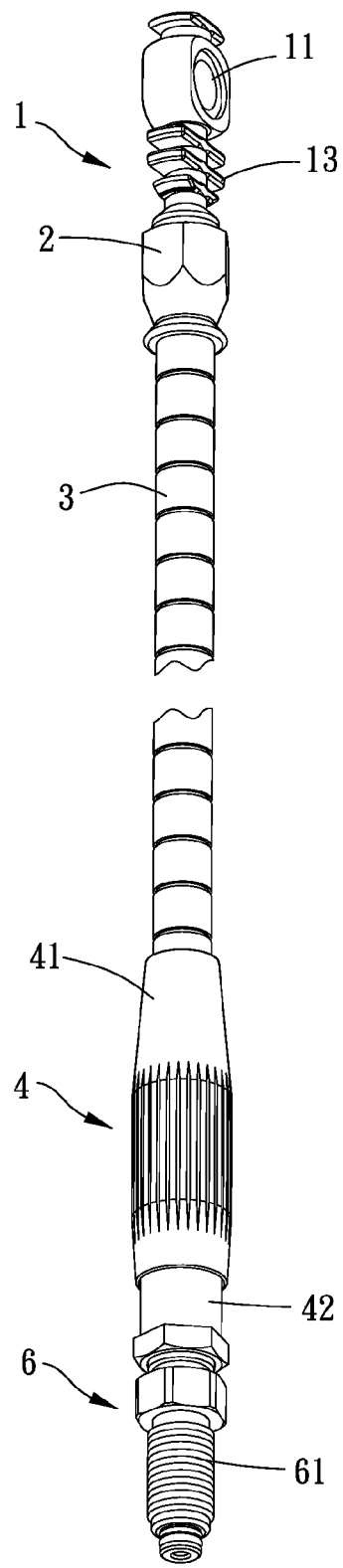
FIG. 1 is a perspective view of the present invention.
Figure 2:
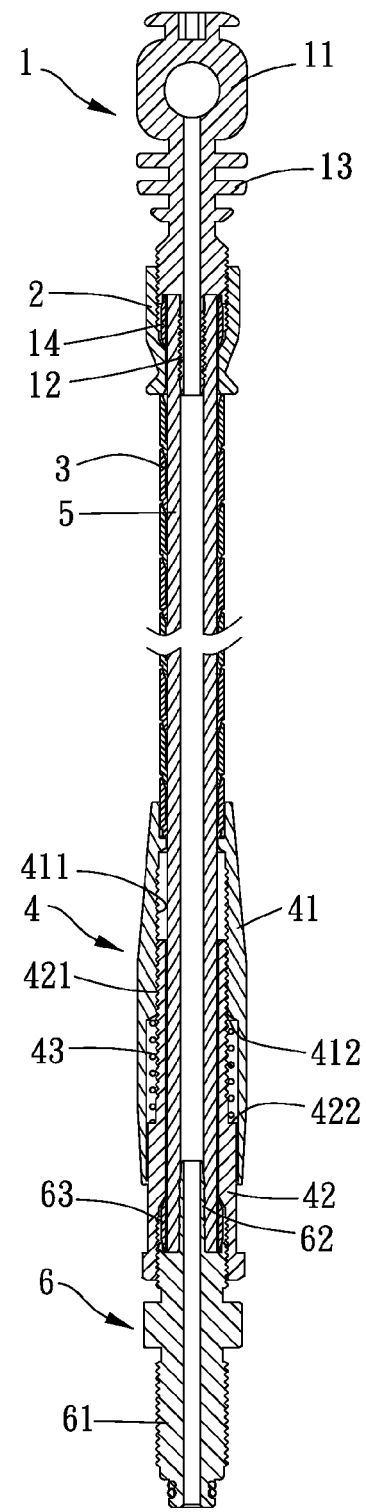
FIG. 2 is a cross-sectional view of the present invention.

As shown in FIGS. 1 to 4, a heat-dissipating device for hydraulic brake system of the present invention includes a heat-dissipating element 1, a sleeve element 2 and a plurality of heat-dissipating tube unit 3. The heat-dissipating device can be adapted to be mounted between a brake oil tube 5 and a brake mechanism 7.

Figures 3, 3A, 3B:
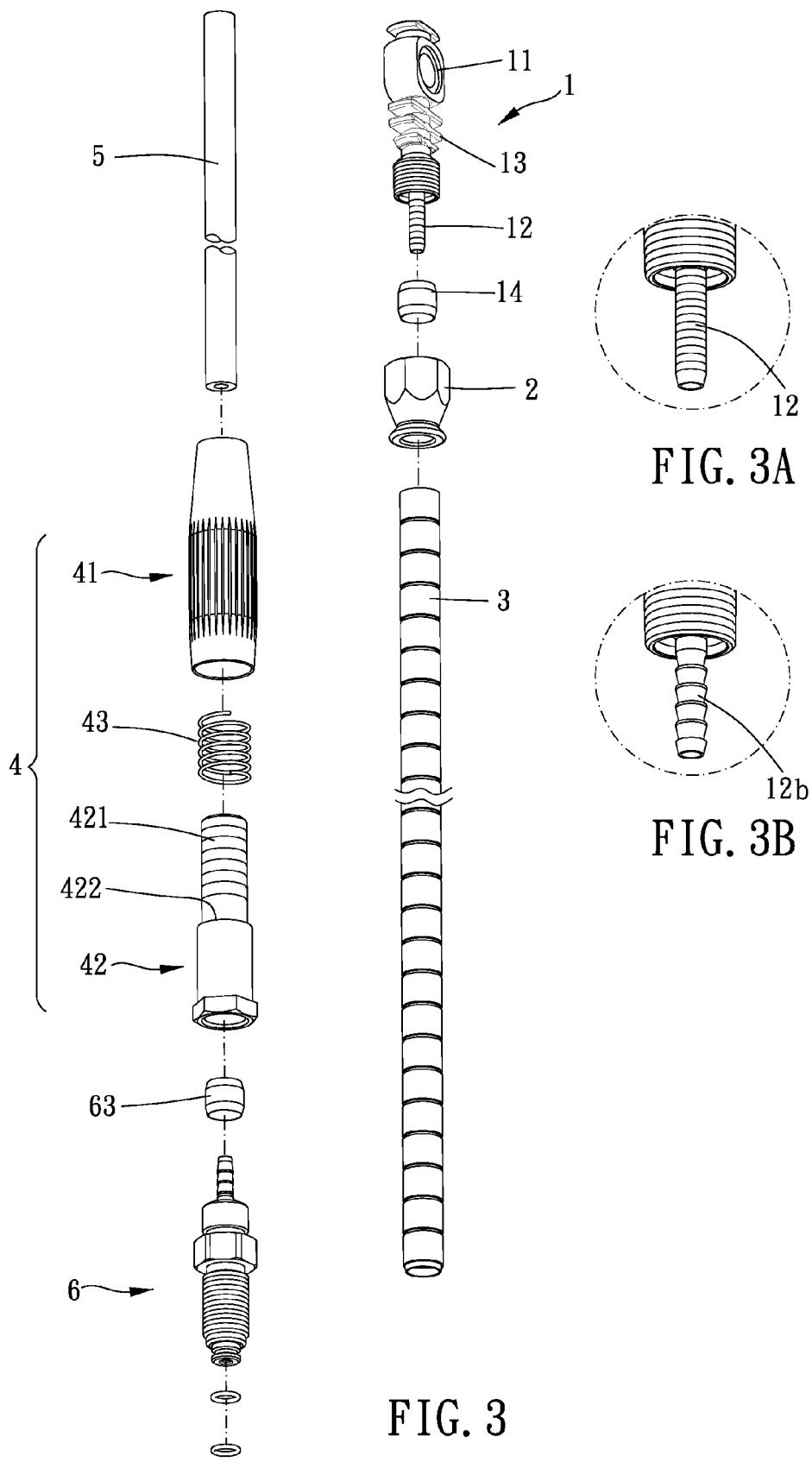
FIG. 3 is a perspective breakdown drawing of the present invention.
FIG. 3A is a partial close-up view FIG. 3.
FIG. 3B is a partial close-up view according to a second embodiment of the present invention.
Figure 4:
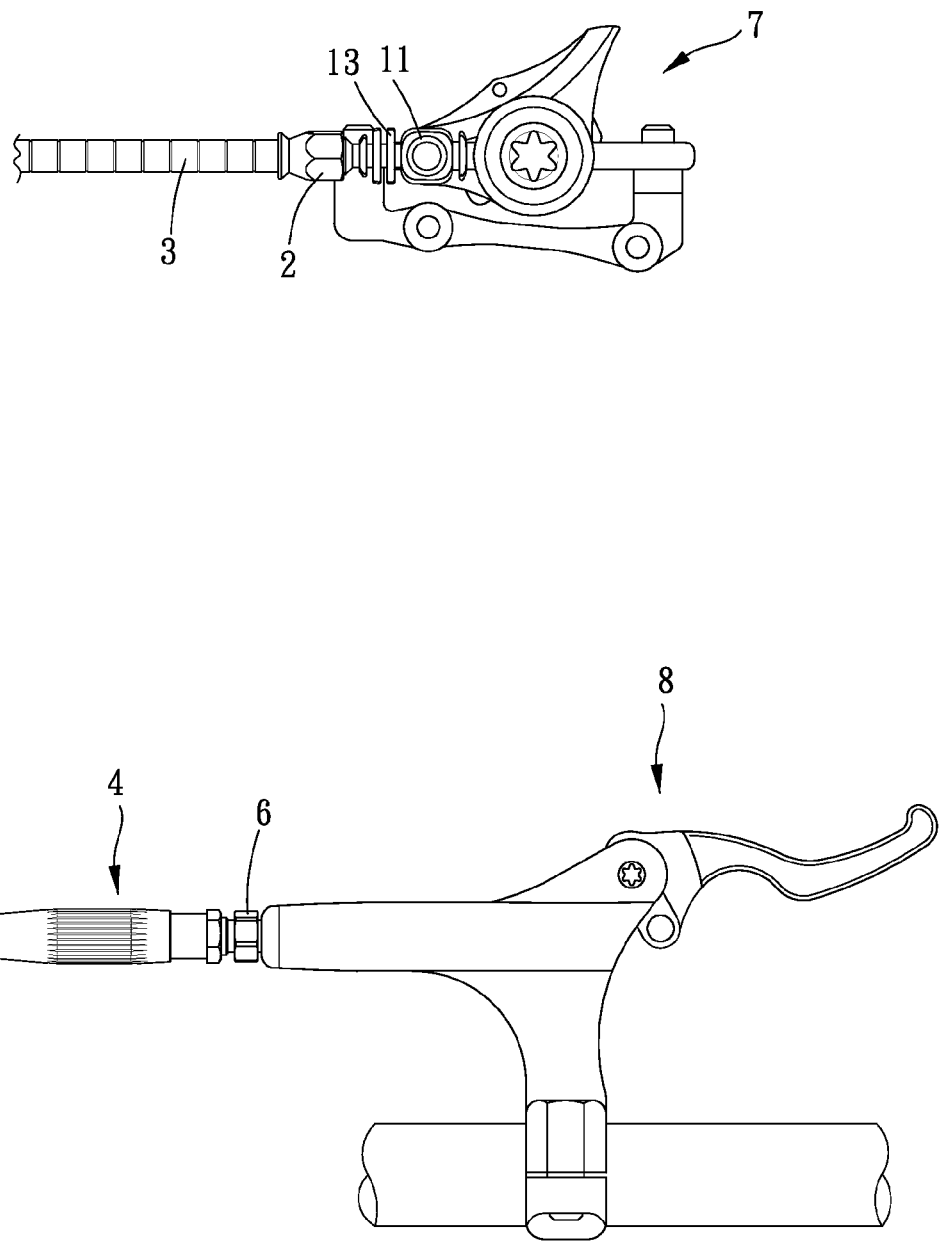
FIG. 4 is a drawing showing a heat-dissipating device for hydraulic brake system in use according to the present invention.

The heat-dissipating element 1 is hollow and has a fixation end 11 and a connecting end 12 corresponding to each other. The fixation end 11 is adapted for being connected to and communicated with the brake mechanism 7 or a hydraulic cylinder, and the connecting end 12 is adapted for being connected to the oil tube 5 so that the heat-dissipating element 1 and the oil tube 5 are tightly connected and communicated with each other. The heat-dissipating element 1 further includes a heat-dissipating portion 13 disposed between the fixation end 11 and the connecting end 12. Preferably, the heat-dissipating portion 13 is formed with a plurality of heat-dissipating fins, and the heat-dissipating fins project radially outward from the heat-dissipating element 1 and are arranged alternatively. More specifically, the heat-dissipating element 1 is made of metal, and the heat-dissipating fins are preferably arranged in the same plane and in fish-bone shape. A radial extent of each of the heat-dissipating fin is greater than an extent of the spacing of each two adjacent heat-dissipating fins, so as to significantly increase heat-dissipating surface area. The lengths of the heat-dissipating fins from the fixation end 11 to the connecting end 12 are gradually decreased. The connecting end 12 has a threaded section whose outer diameter is not greater than the inner diameter of the oil tube 5. An outer surface of the threaded section is formed with a thread (as shown in FIG. 3A), plural annular cams (the connecting end 12b as shown in FIG. 3B) or the like for being connected to the oil tube 5. The heat-dissipating element 1 further includes an outer thread located between the heat-dissipating portion 13 and the threaded section. An annular recess which faces away from the fixation end and is centered about the threaded section is formed between the threaded section and the outer thread.

The sleeve element 2 is sleeved around the joint portion of the heat-dissipating element 1 and the oil tube 5 and disposed at the connecting end 12 of the heat-dissipating element 1, and the sleeve element 2 can strengthen the combination of the heat-dissipating element 1 and the oil tube 5 and improve leakage-proof effect. Preferably, the sleeve element 2 has a first end and a second end, an inner surface of the first end of the sleeve element 2 is formed with an inner thread for being connected to the outer thread of the heat-dissipating element 1, an inner surface of second end of the sleeve element 2 is formed with a necked section having a smaller inner diameter, so that a space is formed between the necked section and the annular recess of the heat-dissipating element 1. The heat-dissipating device for hydraulic brake system further includes an elastic washer 14 which is sleeved around the oil tube 5 and retained between the sleeve element 2 and the oil tube 5. That is, the washer 14 is located in the space between the necked section and the annular recess so as to avoid the leakage.

The heat-dissipating tube units 3 are sleeved around the oil tube 5 and sequentially connected, and one of the heat-dissipating tube units 3 abuts against the sleeve element. Preferably, the heat-dissipating tube units 3 include cooperative engaging mechanisms, so that the heat-dissipating tube units 3 can be sequentially connected and conduct the heat from the heat-dissipating element 1 and dissipate the heat outside.

In a preferable embodiment according to the present invention, a heat-dissipating device for hydraulic brake system further includes a adjusting element 4 which is disposed at the remote end (away from the heat-dissipating element 1) of the oil tube 5. The heat-dissipating tube units 3 which are sequentially connected abut against and between the sleeve element 2 and the adjusting element 4 and are thereby positioned. The adjusting element 4 is adjustable in length so as to abut against the heat-dissipating tube units 3 and be thereby positioned. Preferably, the adjusting element 4 includes an external tube 41, an internal tube 42 and an elastic element 43. An inner surface of the external tube 41 is formed with an inner threaded section 411, and an outer surface of the internal tube 42 is formed with an outer threaded section 421. The inner surface of the external tube 41 is formed further with a first blocking portion 412 protruding inwardly, and the outer surface of the internal tube 42 is formed further with a second blocking portion 422 protruding outwardly. The inner threaded section 411 of the external tube and the outer threaded section 421 of the internal tube are screwed together, the second blocking portion 422 is located in the external tube 41, and the elastic element 43 abuts against and between the first blocking portion 412 and the second blocking portion 422. The length of the adjusting element 4 can be changed via screwing the external tube 41, such that the adjusting element 4 can abut against the heat-dissipating tube units 3.

In actual use, the heat-dissipating element 1 is connected to an oil hydraulic cylinder or the brake mechanism 7 via its fixation end 11, and the remote end of the oil tube 5 away from the heat-dissipating element 1 is adapted for receiving a joint head 6 having a threaded portion 62. An end of the joint head 6 may have a thread 61 for being connected to a brake handlebar 8. Preferably, a washer 63 may be disposed between the joint portion of the oil tube 5 and the joint head 6 and the adjusting element 4 so as to improve the leakage-proof effect.

Figure 5B:
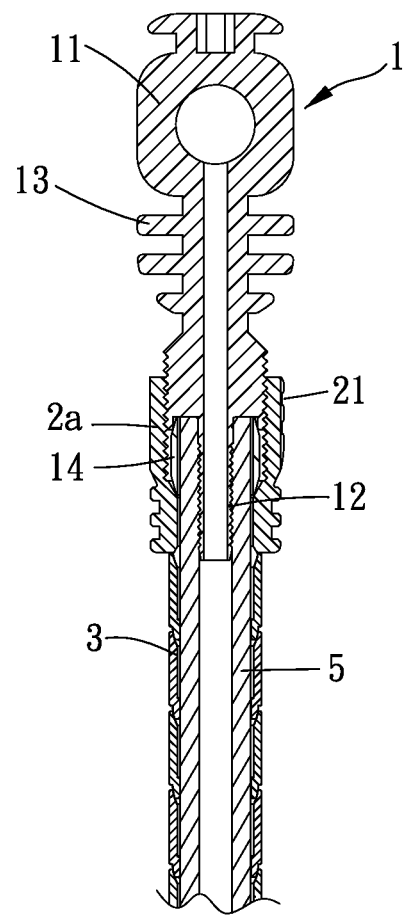
FIG. 5B is a partial cross-sectional view according to the third embodiment of the present invention.
Figure 5A:
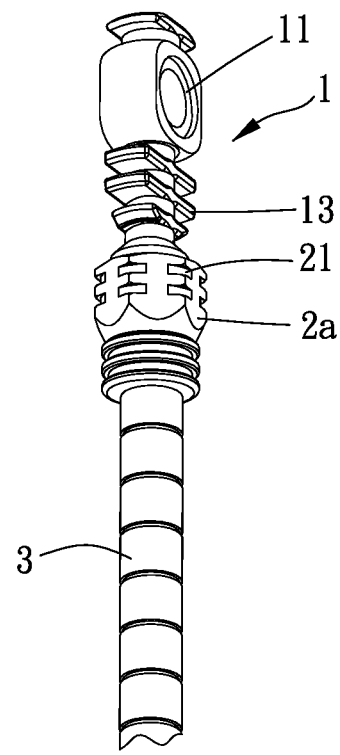
FIG. 5A is a partial perspective view according to a third embodiment of the present invention.

In a preferable embodiment as shown in FIGS. 5A and 5B according to the present invention, an outer surface of a sleeve element 2a is formed with at least one groove 21 so as to increase heat-dissipating surface area.

Figure 6B:
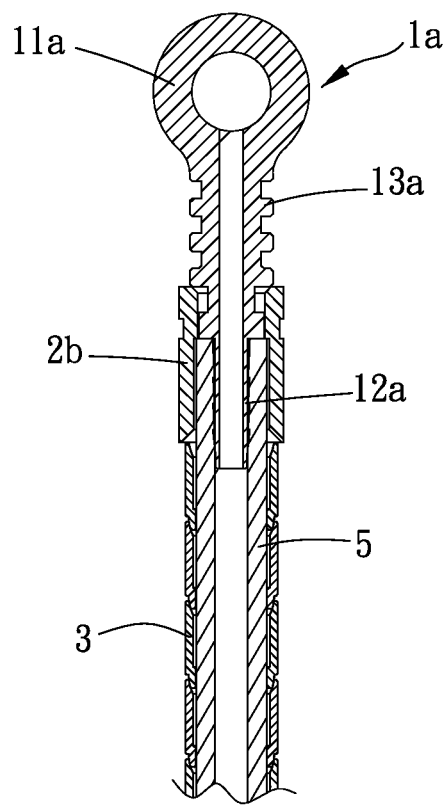
FIG. 6B is a partial cross-sectional view according to the fourth embodiment of the present invention.
Figure 6A:
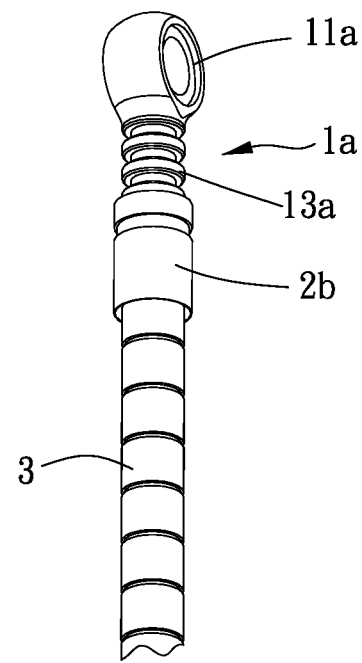
FIG. 6A is a partial perspective view according to a fourth embodiment of the present invention.

In a preferable embodiment as shown in FIGS. 6A and 6B according to the present invention, a heat-dissipating element 1a includes a fixation end 11a, a connecting end 12a and a heat-dissipating portion 13a. A sleeve element 2b may be directly sleeved around the joint portion of the heat-dissipating element 1a and the oil tube 5 and is then fixedly positioned via pressing without thread and washer, and this can also result in a firm fixation of the sleeve element 2b and an excellent leakage-proof effect.

Figure 7B:
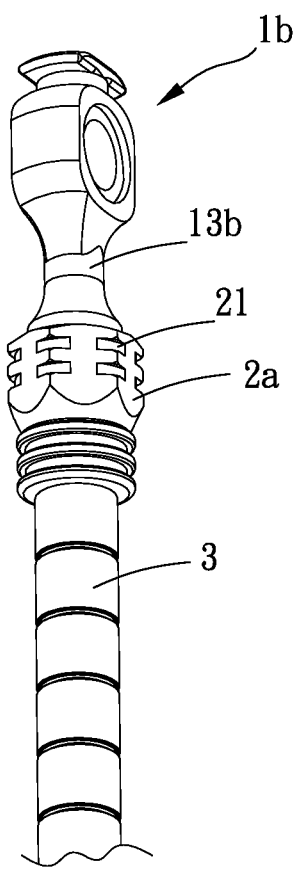
FIG. 7B is a partial cross-sectional view according to the fifth embodiment of the present invention.
Figure 7A:
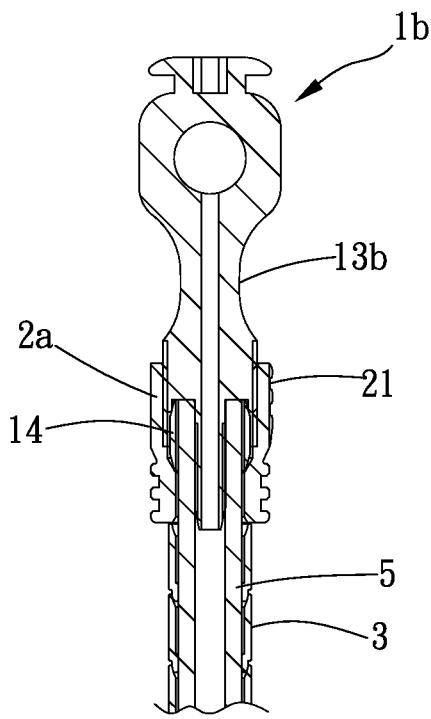
FIG. 7A is a partial perspective view according to a fifth embodiment of the present invention.
Figures 8A, 8B:
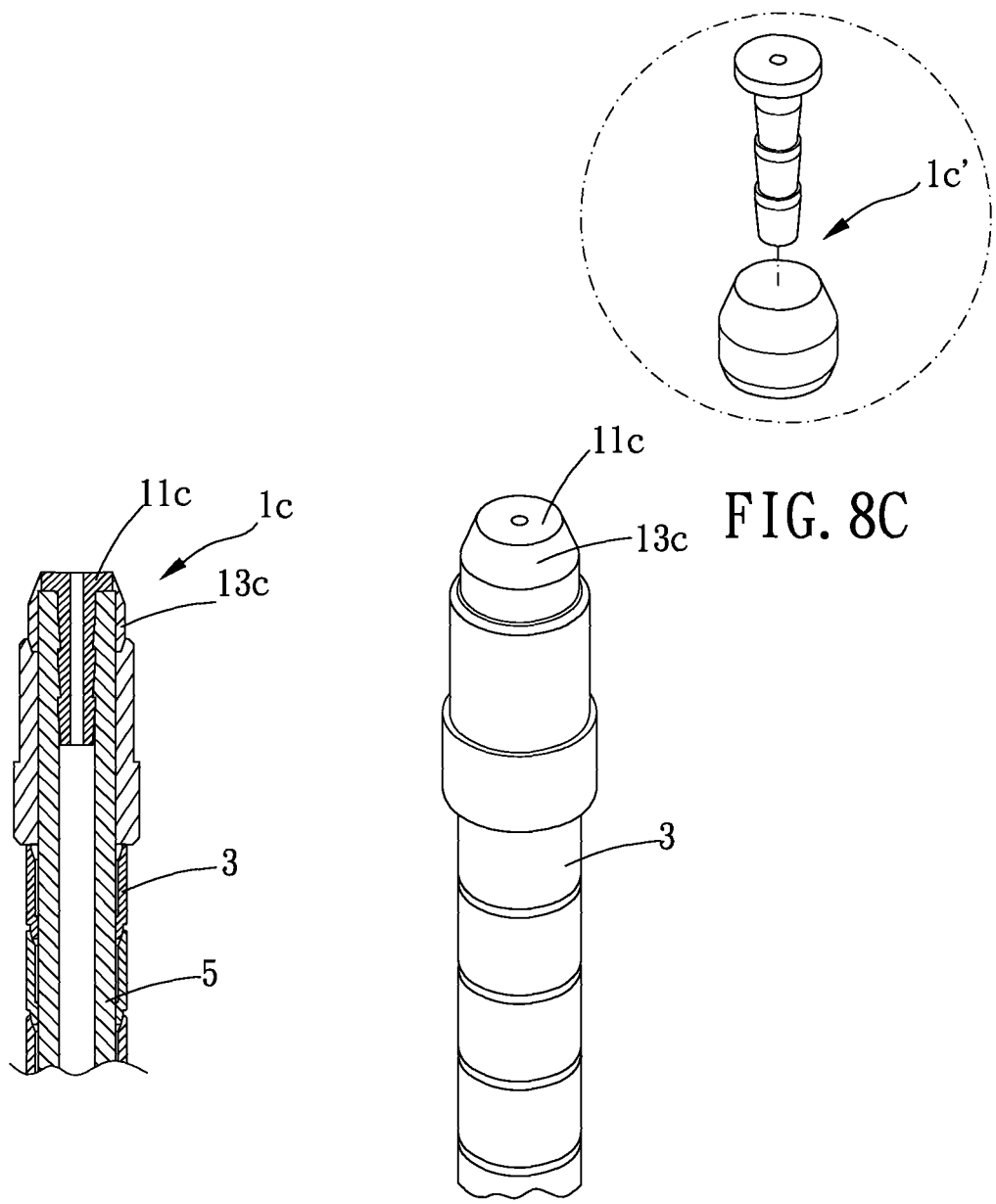
FIG. 8A is a partial perspective view according to a sixth embodiment of the present invention.
FIG. 8B is a partial cross-sectional view according to the sixth embodiment of the present invention.

In a preferable embodiment as shown in FIGS. 7A and 7B according to the present invention, a heat-dissipating element 1b includes a smooth recessed heat-dissipating portion 13b. In a heat-dissipating element 1c of a preferable embodiment as shown in FIGS. 8A and 8B according to the present invention, the structure of the heat-dissipating element 1c is much simplified. The heat-dissipating element 1c has a smaller fixation end 11c and a smaller heat-dissipating portion 13c in size. Heat-dissipating element may be composed of two parts, such as a heat-dissipating element 1c' as shown in FIG. 8C.

Given the above, the heat-dissipating device for hydraulic brake system of the present invention has a simple and flexibly-assembled structure, can provide function of leakage-proofing, has larger heat-dissipating surface area, can provide protection for the oil tube, and is flexibly adjustable.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A heat-dissipating device for hydraulic brake system, including:
   a heat-dissipating element, being hollow and having a fixation end and a connecting end corresponding to each other, the fixation end being connected to and communicated with a brake mechanism, the connecting end being received in an oil tube so that the heat-dissipating element and the oil tube are tightly connected and communicated with each other via the connecting end, and the heat-dissipating element having a heat-dissipating portion disposed between the fixation end and the connecting end;
   a sleeve element, sleeved around a joint portion of the heat-dissipating element and the oil tube and disposed at the connecting end of the heat-dissipating element, and the sleeve element serving to strengthen the combination of the heat-dissipating element and the oil tube and improve leakage-proof effect; and
   a plurality of heat-dissipating tube units, sleeved around the oil tube and sequentially connected, and one of the heat-dissipating tube units abutting against the sleeve element;
   wherein the connecting end is coaxially received in the oil tube;
   wherein the connecting end, the oil tube and the sleeve element are coaxially arranged and radially overlapped;
   wherein the heat-dissipating tube units are detachably sequentially connected.

2. The heat-dissipating device for hydraulic brake system of claim 1, wherein the heat-dissipating portion includes a plurality of heat-dissipating fins, and the heat-dissipating fins project radially from the heat-dissipating element and are arranged alternatively.

3. The heat-dissipating device for hydraulic brake system of claim 2, wherein the lengths of the heat-dissipating fins from the fixation end to the connecting end are decreased.

4. The heat-dissipating device for hydraulic brake system of claim 1, further including a washer, wherein the washer is sleeved around the oil tube and retained between the sleeve element and the oil tube, and the washer is radially abutted at least between an inner surface of the heat-dissipating element and an outer surface of the oil tube.

5. The heat-dissipating device for hydraulic brake system of claim 1, wherein an outer surface of the sleeve element is formed with at least one groove to increase heat-dissipating surface area.

6. The heat-dissipating device for hydraulic brake system of claim 1, wherein an outer surface of the connecting end of the heat-dissipating element is formed with an outer thread, an inner surface of one end of the sleeve element is formed with an inner thread, and the outer thread of the heat-dissipating element and the inner thread of the sleeve element are screwed together.

7. The heat-dissipating device for hydraulic brake system of claim 1, wherein the sleeve element is fixedly disposed around the oil tube and the heat-dissipating element via pressing, such that the sleeve element, the oil tube and the heat-dissipating element are positioned and in a gas-sealing relationship.

8. The heat-dissipating device for hydraulic brake system of claim 1, further including a adjusting element, wherein the adjusting element is disposed at one end of the oil tube away from the heat-dissipating element, the heat-dissipating tube units which are sequentially connected abut against and between the sleeve element and the adjusting element and are thereby positioned, and the adjusting element is adjustable in length so as to abut against the heat-dissipating tube units and be thereby positioned.

9. The heat-dissipating device for hydraulic brake system of claim 8, wherein the adjusting element includes an external tube, an internal tube and an elastic element, an inner surface of the external tube is formed with an inner threaded section, an outer surface of the internal tube is formed with an outer threaded section, the inner surface of the external tube is formed with a first blocking portion protruding inwardly, the outer surface of the internal tube is formed with a second blocking portion protruding outwardly, the inner threaded section of the external tube and the outer threaded section of the internal tube are screwed together, the second blocking portion is located in the external tube, and the elastic element abuts against and between the first blocking portion and the second blocking portion.

10. The heat-dissipating device for hydraulic brake system of claim 4, wherein the washer includes two opposing conically tapered ends.

11. The heat-dissipating device for hydraulic brake system of claim 4, wherein the heat-dissipating element further includes an annular wall coaxially disposed around the connecting end, an annular slot is formed between the annular wall and the connecting end, and the washer is partially received in the annular slot.

12. The heat-dissipating device for hydraulic brake system of claim 10, wherein the heat-dissipating element further includes an annular wall coaxially disposed around the connecting end, an annular slot is formed between the annular wall and the connecting end, and the washer is partially received in the annular slot.

13. The heat-dissipating device for hydraulic brake system of claim 10, wherein the sleeve element further includes a conically tapered inner surface, and one of the conically tapered ends is sealingly abutted against the conically tapered inner surface.

* * * * *